US012190554B2

(12) United States Patent
Cheng et al.

(10) Patent No.: US 12,190,554 B2
(45) Date of Patent: Jan. 7, 2025

(54) BOX DETECTION FOR OBJECT ATTACHMENT

(71) Applicant: Lemon Inc., Grand Cayman (KY)

(72) Inventors: Shuo Cheng, Los Angeles, CA (US); Peng Wang, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 383 days.

(21) Appl. No.: 17/666,045

(22) Filed: Feb. 7, 2022

(65) Prior Publication Data

US 2023/0252752 A1  Aug. 10, 2023

(51) Int. Cl.
| | |
|---|---|
| *G06V 10/25* | (2022.01) |
| *G06N 3/045* | (2023.01) |
| *G06T 7/50* | (2017.01) |
| *G06T 7/70* | (2017.01) |

(52) U.S. Cl.
CPC ............. *G06V 10/25* (2022.01); *G06N 3/045* (2023.01); *G06T 7/50* (2017.01); *G06T 7/70* (2017.01); *G06T 2207/20076* (2013.01)

(58) Field of Classification Search
CPC .. G06N 3/045; G06N 3/08; G06T 7/11; G06T 7/50; G06T 7/536; G06T 7/70; G06T 2207/20076; G06T 2207/20084; G06V 10/25; G06V 10/255; G06V 10/82
See application file for complete search history.

(56) References Cited

U.S. PATENT DOCUMENTS

| | | | |
|---|---|---|---|
| 2010/0315412 A1* | 12/2010 | Sinha ..................... | G06T 7/536 345/419 |
| 2014/0192055 A1 | 7/2014 | Kim | |
| 2015/0063684 A1* | 3/2015 | Taylor .................... | G06T 7/536 382/154 |
| 2020/0302686 A1* | 9/2020 | Totty ...................... | G06T 17/00 |
| 2021/0398353 A1 | 12/2021 | Luo et al. | |
| 2023/0124190 A1* | 4/2023 | Chui ...................... | G06T 15/506 348/46 |

(Continued)

FOREIGN PATENT DOCUMENTS

CN  108921889 A  11/2018

OTHER PUBLICATIONS

Ikehata et al. "Panoramic structure from motion via geometric relationship detection." arXiv preprint arXiv:1612.01256 (2016). (Year: 2016).*

(Continued)

*Primary Examiner* — Katrina R Fujita
(74) *Attorney, Agent, or Firm* — BakerHostetler

(57) ABSTRACT

The present disclosure describes techniques for determining a bounding box. An image may be received. An X-frame, a Y-frame, and a normal frame may be estimated based on the image using a first neural network. At least one planar region may be detected from the image using a second neural network. A vanishing point detection may be performed on each of the at least one planar region. Output of the first neural network may be fused with results of the vanishing point detection. A depth value of each pixel in at least one plane corresponding to the at least one planar region may be determined based at least in part on a result of the fusing. A location of a bounding box may be determined based at least in part on the depth value of each pixel in the at least one plane.

17 Claims, 9 Drawing Sheets

(56) References Cited

U.S. PATENT DOCUMENTS

2023/0215087 A1\* 7/2023 Castillo .................... G06T 7/11
　　　　　　　　　　　　　　　　　　　　　345/419

OTHER PUBLICATIONS

Wang et al. "Designing deep networks for surface normal estimation." Proceedings of the IEEE conference on computer vision and pattern recognition. 2015. (Year: 2015).\*
Yang et al. "Automatic 3d indoor scene modeling from single panorama." Proceedings of the IEEE Conference on Computer Vision and Pattern Recognition. 2018. (Year: 2018).\*
Zhou et al. "HoliCity: A city-scale data platform for learning holistic 3D structures." arXiv preprint arXiv:2008.03286v2 (2021). (Year: 2021).\*
Huang et al.; "FrameNet: Learning Local Canonical Frames of 3D Surfaces from a Single RGB Image"; IEEE/CVF Int'l Conf. on Computer Vision; 2019; 13 pages.
Liu et al.; "PlaneRCNN: 3D Plane Detection and Reconstruction from a Single Image"; IEEE/CVF Conf. on Computer Vision and Pattern Recognition; 2019; 16 pages.
Lu et al.; "2-Line Exhaustive Searching for Real-Time Vanishing Point Estimation in Manhattan World"; IEEE Winter Conf. on Applications of Computer Vision; 2017; 9 pages.
International Patent Application No. PCT/SG2023/050056; Int'l Search Report and the Written Opinion; dated Aug. 2, 2023; 9 pages.
Wang et al.; "VPLNet: Deep Single View Normal Estimation with Vanishing Points and Lines"; IEEE/CVF Conf. on Computer Vision and Pattern Recognition; 2020; p. 689-698.

\* cited by examiner

BOX DETECTION FOR OBJECT ATTACHMENT

BACKGROUND

Communication is increasingly being conducted using Internet-based tools. The Internet-based tools may be any software or platform. Users may create content to be shared via such Internet-based tools. Improved techniques for content creation via such Internet-based tools are desirable.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION OF ILLUSTRATIVE EMBODIMENTS

Communication can be conducted using Internet-based tools that allow users to create content and distribute such content to other users for consumption. Such Internet-based tools may provide users with various tools to use when creating content. One or more of the tools may allow users to attach objects to images and/or video frames. For example, a user (e.g., content creator) attach a decal (e.g., sticker) to a background image. The background image may be an image or video frame that depicts the user, or an image or video frame that depicts something (e.g., a building, landscape, landmark, or any other object) or somebody other than the user. Thus, object (i.e., decal) attachment is one of the important effects associated with building augmented reality (AR) applications.

However, object attachment requires a comprehensive and accurate three-dimensional (3D) reconstruction and semantic understanding of the environment depicted in the background image. Previous techniques for object attachment mainly rely on simultaneous localization and mapping (SLAM) systems, which leads to heavy computation and also requires stream video (i.e., not a single image or video frame) as input. Thus, an improved technique for object attachment that can operate on a single image frame is desirable.

Described herein are techniques for such an improved object attachment technique. The improved technique described herein utilizes a learning-based hybrid system that can directly operate on a single image frame. The system described herein leverages the merits of both learning-based approaches and classical methods for recognizing geometry primitives (i.e., vanishing points, 3D frames, planar regions, normal) in a single image observation. The system described herein utilizes neural networks for recognizing semantic attributes in the environment of the image. Additionally, the system described herein utilizes a logic flow that filters out less accurate or satisfactory predictions and fuses the intermediate geometric representations from different components for generating final 3D box proposals. Such 3D box proposals may indicate an area in the single image where an object is to be attached.

Figure 1:
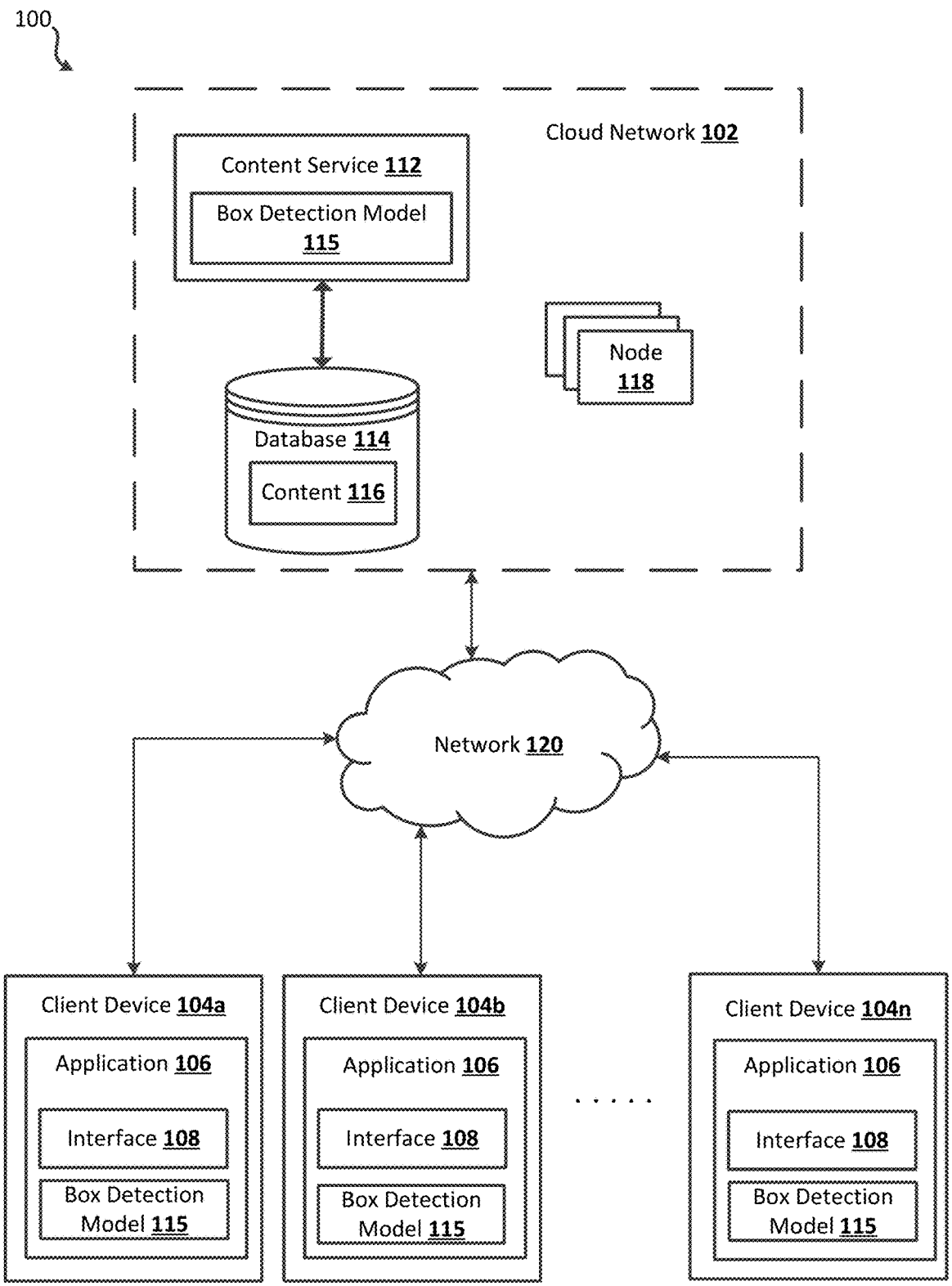
FIG. 1 shows an example system that may be used in accordance with the present disclosure.

FIG. 1 illustrates an example system 100 for detecting a 3D box for object attachment. The system 100 may comprise a cloud network 102 and a plurality of client devices 104a-n. The cloud network 102 and the plurality of client devices 104a-n may communicate with each other via one or more networks 120.

The cloud network 102 may be located at a data center, such as a single premise, or be distributed throughout different geographic locations (e.g., at several premises). The cloud network 102 may provide the services via the one or more networks 120. The network 120 comprise a variety of network devices, such as routers, switches, multiplexers, hubs, modems, bridges, repeaters, firewalls, proxy devices, and/or the like. The network 120 may comprise physical links, such as coaxial cable links, twisted pair cable links, fiber optic links, a combination thereof, and/or the like. The network 120 may comprise wireless links, such as cellular links, satellite links, Wi-Fi links and/or the like.

The cloud network 102 may comprise a plurality of computing nodes 118 that host a variety of services. In an embodiment, the nodes 118 host a content service 112. The content service 112 may comprise a content streaming service, such as an Internet protocol video streaming service. The content service 112 may be configured to distribute content 116 via a variety of transmission techniques. The content service 112 is configured to provide the content 116, such as video, audio, textual data, a combination thereof, and/or the like. The content 116 may comprise content streams (e.g., video stream, audio stream, information stream), content files (e.g., video file, audio file, text file), and/or other data. The content 116 may be stored in a database 114. For example, the content service 112 may comprise a video sharing service, a video hosting platform, a content distribution platform, a collaborative gaming platform, and/or the like.

In an embodiment, the content 116 distributed or provided by the content service 112 comprises short videos. The short videos may have a duration less than or equal to a predetermined time limit, such as one minute, five minutes, or other predetermined minutes. By way of example and without limitation, the short videos may comprise at least one, but no more than four, 15 second segments strung together. The short duration of the videos may provide viewers with quick bursts of entertainment that allow users to watch a large quantity of videos in a short time frame. Such quick bursts of entertainment may be popular on social media platforms.

The short videos may comprise a pre-recorded audio overlay, such as a clip of a pre-recorded song or audio from a television show or movie. If a short video comprises a pre-recorded audio overlay, the short video may feature one or more individuals lip-syncing, dancing, or otherwise moving their body along with the pre-recorded audio. For example, a short video may feature an individual completing a "dance challenge" to a popular song or a short video may feature two individuals participating in a lip-syncing or dancing duet. As another example, a short video may feature an individual completing a challenge that requires them to move his or her body in a manner that corresponds to the pre-recorded audio overlay, such as in a manner that corresponds to the beat or rhythm of the pre-recorded song featured by the pre-recorded audio overlay. Other short videos may not comprise a pre-recorded audio overlay. For example, these short videos may feature an individual playing sports, pulling pranks, or giving advice, such as beauty and fashion advice, cooking tips, or home renovation tips.

In an embodiment, the content 116 may be output to different client devices 104a-n via the network 120. The content 116 may be streamed to the client devices 104a-n. The content stream may be a stream of short videos received from the content service 112. The plurality of client devices 104a-n may be configured to access the content 116 from the content service 112. In an embodiment, a client device 104a-n may comprise a content application 106. The content application 106 outputs (e.g., display, render, present) the content 116 to a user associated with the client device 104a-n. The content may comprise videos, audio, comments, textual data and/or the like.

The plurality of client devices 104a-n may comprise any type of computing device, such as a mobile device, a tablet device, laptop, a desktop computer, a smart television or other smart device (e.g., smart watch, smart speaker, smart glasses, smart helmet), a gaming device, a set top box, digital streaming device, robot, and/or the like. The plurality of client devices 104a-n may be associated with one or more users. A single user may use one or more of the plurality of client devices 104a-n to access the cloud network 102. The plurality of client devices 104a-n may travel to a variety of locations and use different networks to access the cloud network 102.

The content service 112 may be configured to receive input from users. The users may be registered as users of the content service 112 and may be users of the content application 106 operating on client devices 104a-n. The user inputs may include short videos created by users, user comments associated with short videos, or "likes" associated with short videos. The user inputs may include connection requests and user input data, such as text data, digital image data, or user content. The connection requests may comprise requests from the client devices 104a-n to connect to the content service 112. The user input data may include information, such as short videos and/or user comments, that the users connected to the content service 112 want to share with other connected users of the content service 112.

The content service 112 may be able to receive different types of input from users using different types of client devices 104a-n. For example, a user using the content application 106 on a first user device, such as a mobile phone or tablet, may be able to create and upload short videos using the content application 106. A user using the content application 106 on a different mobile phone or tablet may also be able to view; comment on, or "like" short videos or comments written by other users. In another example, a user using the content application 106 on a smart television, laptop, desktop, or gaming device may not be able to create and upload short videos or comment on short videos using the content application 106. Instead, the user using the content application 106 on a smart television, laptop, desktop, or gaming device may only be able to use the content application 106 to view short videos, view comments left by other users, and "like" short videos.

In an embodiment, a user may use the content application 106 on a client device 104a-n to create a short video and upload the short video to the cloud network 102. The client devices 104a-n may access an interface 108 of the content application 106. The interface 108 may comprise an input element. For example, the input element may be configured to allow users to create the short video. To create the short video, the user may give the content application 106 permission to access an image capture device, such as a camera, or a microphone of the client device 104a-n. Using the content application 106, the user may select a duration for the short video or set a speed for the short video, such as "slow-motion" or "speed things up."

The user may edit the short video using the content application 106. The user may add one or more texts, filters, sounds, or effects, such as AR effects, to the short video. To add a pre-recorded audio overlay to the short video, the user may select a song or sound clip from a sound library of the content application 106. The sound library may include different songs, sound effects, or audio clips from movies, albums, and television shows. In addition to or in lieu of adding a pre-recorded audio overlay to the short video, the user may use the content application 106 to add a voice-over to the short video. The voice-over may be a sound recorded by the user using a microphone of the client device 104a-n. The user can add a text overlay to the short video and may use the content application 106 to specify when they want the text overlay to appear in the short video. The user may assign a caption, location tag, and one or more hashtags to the short video to indicate the subject matter of the short video. The content application 106 may prompt the user to select a frame of the short video to use as a "cover image" for the short video.

After the user has created the short video, the user may use the content application 106 to upload the short video to the cloud network 102 and/or to save the short video locally to the user device 104a-n. When a user uploads the short video to the cloud network 102, they may choose whether they want the short video to be viewable by all other users of the content application 106 or viewable by only a subset of the users of the content application 106. The content service 112 may store the uploaded short videos and any metadata associated with the short videos as content 116 in one or more databases 114.

In an embodiment, a user may use the content application 106 on a client device 104a-n to provide input on a short video. The client devices 104a-n may access an interface 108 of the content application 106 that allows users to provide input associated with short videos. The interface 108 may comprise an input element. For example, the input element may be configured to receive input from a user, such as comments or "likes" associated with a particular short video. If the input is a comment, the content application 106 may allow a user to set an emoji associated with his or her input. The content application 106 may determine timing information for the input, such as when a user wrote a comment. The content application 106 may send the input and associated metadata to the cloud network 102. For example, the content application 106 may send a comment, an identifier of the user that wrote the comment, and the timing information for the comment to the cloud network 102. The content service 112 may store the input and associated metadata in a database 114.

The content service 112 may be configured to output the uploaded short videos and user input to other users. The users may be registered as users of the content service 112 to view short videos created by other users. The users may be users of the content application 106 operating on client devices 104a-n. The content application 106 may output (display, render, present) the short videos and user comments to a user associated with a client device 104a-n. The client devices 104a-n may access an interface 108 of the content application 106. The interface 108 may comprise an output element. The output element may be configured to display information about different short videos so that a user can select a short video to view. For example, the output element may be configured to display a plurality of cover images, captions, or hashtags associated with the short videos. The output element may also be configured to arrange the short videos according to a category associated with each short video.

In an embodiment, the user comments associated with a short video may be output to other users watching the same short video. For example, all users accessing a short video may view comments associated with the short video. The content service 112 may output the short video and the associated comments simultaneously. Comments may be output by the content service 112 in real-time or near-real-time. The content application 106 may display the short videos and comments in various ways on the client device 104a-n. For example, the comments may be displayed in an overlay above the content or in an overlay beside the content. As another example, a user that wants to view other users' comments associated with a short video may need to select a button in order to view the comments. The comments may be animated when displayed. For example, the comments may be shown scrolling across the short video or across the overlay.

The plurality of computing nodes 118 may process tasks associated with the content service 112. The plurality of computing nodes 118 may be implemented as one or more computing devices, one or more processors, one or more virtual computing instances, a combination thereof, and/or the like. The plurality of computing nodes 118 may be implemented by one or more computing devices. The one or more computing devices may comprise virtualized computing instances. The virtualized computing instances may comprise a virtual machine, such as an emulation of a computer system, operating system, server, and/or the like. A virtual machine may be loaded by a computing device based on a virtual image and/or other data defining specific software (e.g., operating systems, specialized applications, servers) for emulation. Different virtual machines may be loaded and/or terminated on the one or more computing devices as the demand for different types of processing services changes. A hypervisor may be implemented to manage the use of different virtual machines on the same computing device.

In an embodiment, the cloud network 102 and/or the client devices 104a-n comprise a box detection model 115. The box detection model 115 facilitates the detection of 3D boxes. Such 3D boxes indicate an area in single images where an object is to be attached. The box detection model 115 utilizes a learning-based hybrid system that can directly operate on a single image frame. The box detection model 115 leverages the merits of both learning-based approaches and classical methods for recognizing geometry primitives (i.e., vanishing points, 3D frames, planar regions, normal) in a single image observation. The box detection model 115 utilizes neural networks for recognizing semantic attributes in the environment of the image. Additionally, the box detection model 115 utilizes a logic flow that filters out less accurate or satisfactory predictions and fuses the intermediate geometric representations from different components for generating final 3D box proposals. Such 3D box proposals may indicate an area in the single image where an object is to be attached. For example, such 3D box proposals may indicate an area in a frame of a short video where an object, such as a sticker, is to be attached by a content creator.

Figure 2:
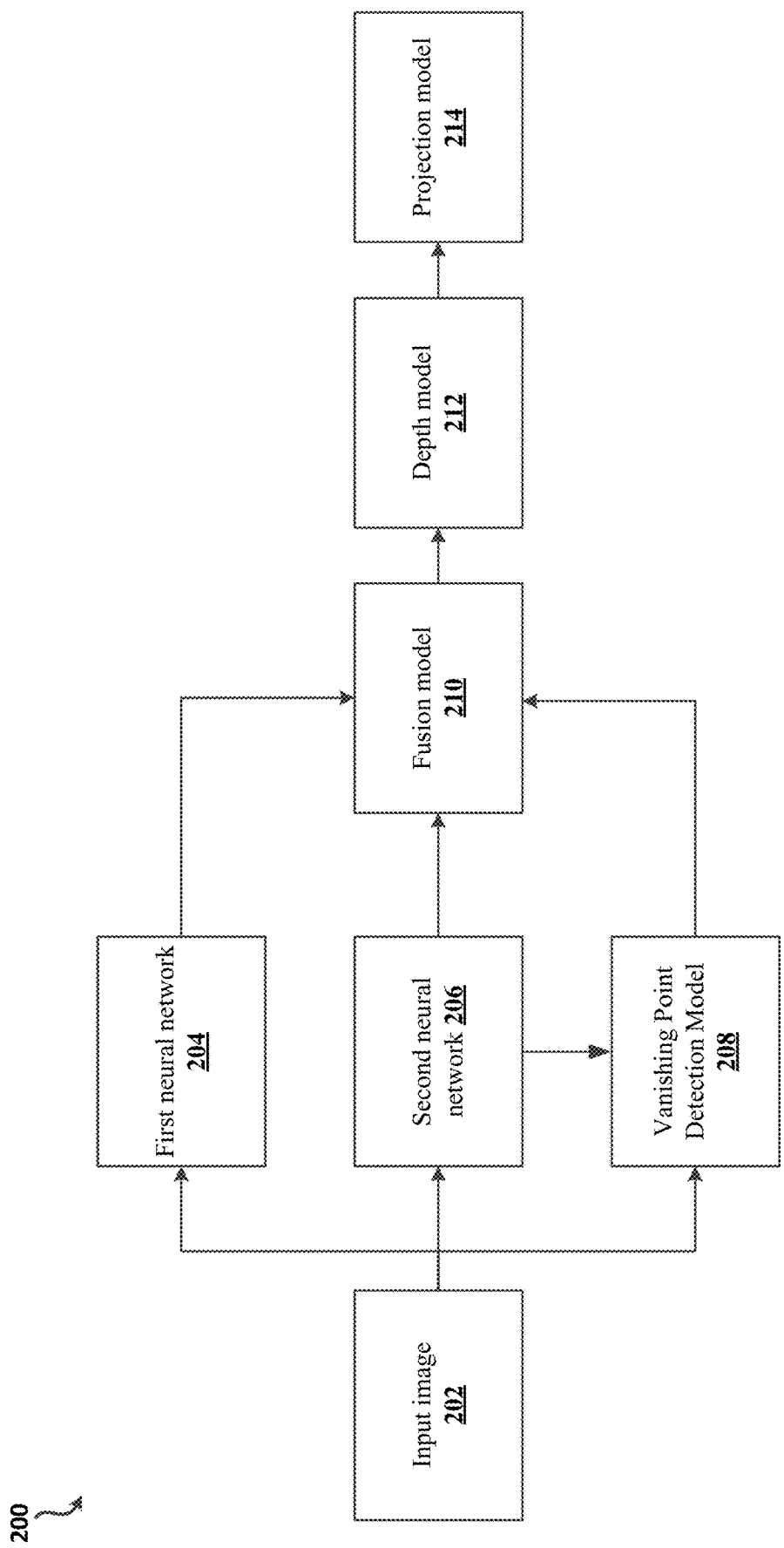
FIG. 2 shows an example architecture of a box detection model in accordance with the present disclosure.

The box detection model 115 (client-side and/or server-side) may have an architecture that is the same as, or similar to, the architecture described with regard to FIG. 2. FIG. 2 illustrates an example architecture 200 for a box detection model (i.e., box detection model 115). The box detection model receives, as input, a single image 202. The single image 202 may be an image or video frame that depicts a user of the content service 122, or an image or video frame that depicts something (e.g., a building, landscape, landmark, or any other object) or somebody other than the user. The single image 202 may be an image that a user wants to attach an object (i.e., decal) to.

The single image 202 may be fed into a first neural network 204. The first neural network 204 may receive the single image 202. The first neural network 204 may include any neural network that is capable of determining 3D frame predictions associated with a single image. For example, the first neural network 204 may be configured to receive the image 202 and predict canonical 3D coordinate frames from the image 202. Each pixel in the image 202 corresponds to a surface in the underlying 3D geometry of the scene depicted by the image 202. A canonical frame can be identified as represented by three orthogonal axes: one along its normal direction and two in its tangent plane (i.e., X-axis and Y-axis).

The first neural network 204 may be configured to output the predicted canonical 3D coordinate frames associated with the image 202. In an embodiment, the output of the first neural network 204 includes a X-frame with dimensions H×W×3, where each pixel contains the 3D orientation of the X-axis, a Y-frame with dimensions H×W×3, where each pixel contains the 3D orientation of the Y-axis, and a normal-frame with dimensions H×W×3, where each pixel contains the 3D orientation of the normal plane.

The single image 202 may additionally be fed into a second neural network 206. The second neural network 206 may receive the single image 202. The second neural network 204 may include any neural network that is capable of detecting and reconstructing piecewise planar surfaces from a single image. For example, the second neural network 204 may be configured to detect planes within the image 202 with their plane parameters and segmentation masks. The second neural network 204 may be configured to output the segmentation masks. In an embodiment, the second neural network 204 outputs N segmentation masks, where the foreground region of each segmentation mask denotes a plane detected within the image 202.

In an embodiment, a vanishing point detection model 208 calculates, for each plane detected within the image 202 by the second neural network 204, orthogonal vanishing points. A vanishing point is a point on an image plane where the two-dimensional perspective projections of mutually parallel lines in three-dimensional space appear to converge. The orthogonal vanishing points provide information related to the orientation of the camera that took the image 202, the world structure depicted by the image 202, and the internal parameters of the image 202.

The fusion model 210 is configured to receive the output from the first neural network 204, the output from the second neural network 206, and/or the results from the vanishing point detection model 208. The results from the vanishing point detection model 208 may be used to refine the output from the first neural network 204. To refine the output from the first neural network 204 with the results from the vanishing point detection model, a confidence of the results from the vanishing point detection model 208 may be determined based on the quantity of detected lines associated with the results from the vanishing point detection model 208.

For example, if the difference between the predicted normal associated with the first neural network 204 and the normal computed from the vanishing point detection model 208 is smaller than a predetermined threshold, this may indicate that the results from the vanishing point detection model 208 are confident. If the results from the vanishing point detection model 208 are confident, then the results from the vanishing point detection model 208 may be utilized to find the main 3D axis. Conversely, if the difference between the predicted normal associated with the first neural network 204 and the normal computed from the vanishing point detection model 208 is greater than or equal to the predetermined threshold, this may indicate that the results from the vanishing point detection model 208 are not confident. If the results from the vanishing point detection model 208 are not confident, then the output from the first neural network 204 may be utilized as the main 3D axis.

In some embodiments, an average, such as a weighted average, of the output from the first neural network 204 and the results from the vanishing point detection model 208 may be utilized as the main 3D axis. For example, the results from the vanishing point detection model 208 may be assigned a greater weight if it is determined that the results from the vanishing point detection model 208 are confident. Conversely, the results from the vanishing point detection model 208 may be assigned a lesser weight if it is determined that the results from the vanishing point detection model 208 are not confident.

In embodiments, a depth model 212 is configured to receive the fusion results from the fusion model 210. For example, the depth model 212 may be configured to utilize the average normal of the plane computed by the fusion model 210 to calculate a pseudo depth of each pixel inside the plane. The depth model 212 may set the central pixel with a depth of 1.0 and may compute the depth value of other pixels inside the plane with default camera intrinsics. For example, the depth model 212 may solve:

$$\begin{bmatrix} u_i \\ v_i \\ 1 \end{bmatrix} \cdot d_i = \begin{bmatrix} f_x & 0 & c_x \\ 0 & f_y & c_y \\ 0 & 0 & 1 \end{bmatrix} \cdot \begin{bmatrix} x_i \\ y_i \\ z_i \end{bmatrix}$$

$$([x_i, y_i, z_i] - [x_0, y_0, z_0]) \cdot \begin{bmatrix} n_x \\ n_y \\ n_z \end{bmatrix} = 0,$$

where $(u_i, v_i)$ denotes the i-th pixel coordinate, $d_i$ denotes the i-th pixel depth value. $\{f_x, f_y, c_x, c_y\}$ denotes camera intrinsics, $(x_i, y_i, z_i)$ denotes the 3D coordinate in camera frame, $(n_x, n_y, n_z)$ represents the normal of the plane, and the central pixel is set with depth 1.0 (i.e., $x_0=0$, $y_0=0$, $z_0=1$). The depth model 212 may solve the above equation to obtain the depth values of each pixel within the plane, and thus to calculate their 3D coordinates $(x_i, y_i, z_i)$.

The depth model 212 may determine the four corners of a bounding box. To determine the four corners of the bounding box, the depth model 212 may project each 3D point to the X-axis and Y-axis as follows:

$$\hat{u}_i = ([x_i, y_i, z_i] - [x_0, y_0, z_0]) \cdot \begin{bmatrix} \bar{u}_x \\ \bar{u}_y \\ \bar{u}_z \end{bmatrix}, \text{ and}$$

$$\hat{v}_i = ([x_i, y_i, z_i] - [x_0, y_0, z_0]) \cdot \begin{bmatrix} \bar{v}_x \\ \bar{v}_y \\ \bar{v}_z \end{bmatrix}$$

where $(\bar{u}_x, \bar{u}_y, \bar{u}_z)$ and $(\bar{v}_x, \bar{v}_y, \bar{v}_z)$ are the X-axis and the Y-axis, respectively. $(\hat{u}_{min}, \hat{u}_{min})$ may be the 15% quartile of $\{\hat{u}_i\}$ and $\{\hat{v}_i\}$, and $(\hat{u}_{max}, \hat{v}_{max})$ may be the 85% quartile of $\{\hat{u}_i\}$ and $\{\hat{v}_i\}$. Then, the depth model 212 can calculate the four corners p1, p2, p3, and p4 of the bounding box by:

$$p1 = [x_0, y_0, z_0] + \hat{u}_{min} * [\bar{u}_x, \bar{u}_y, \bar{u}_z] + \hat{v}_{min} * [\bar{v}_x, \bar{v}_y, \bar{v}_z],$$

$$p2 = [x_0, y_0, z_0] + \hat{u}_{min} * [\bar{u}_x, \bar{u}_y, \bar{u}_z] + \hat{v}_{max} * [\bar{v}_x, \bar{v}_y, \bar{v}_z],$$

$$p3 = [x_0, y_0, z_0] + \hat{u}_{max} * [\bar{u}_x, \bar{u}_y, \bar{u}_z] + \hat{v}_{min} * [\bar{v}_x, \bar{v}_y, \bar{v}_z],$$

$$p4 = [x_0, y_0, z_0] + \hat{u}_{max} * [\bar{u}_x, \bar{u}_y, \bar{u}_z] + \hat{v}_{max} * [\bar{v}_x, \bar{v}_y, \bar{v}_z].$$

A projection model 214 may receive these four corners from the depth model 212. The projection model 214 may be configured to project these four corners to image space. For example, the projection model 214 may, with the camera intrinsics, project these four corners to image space.

Figure 3:
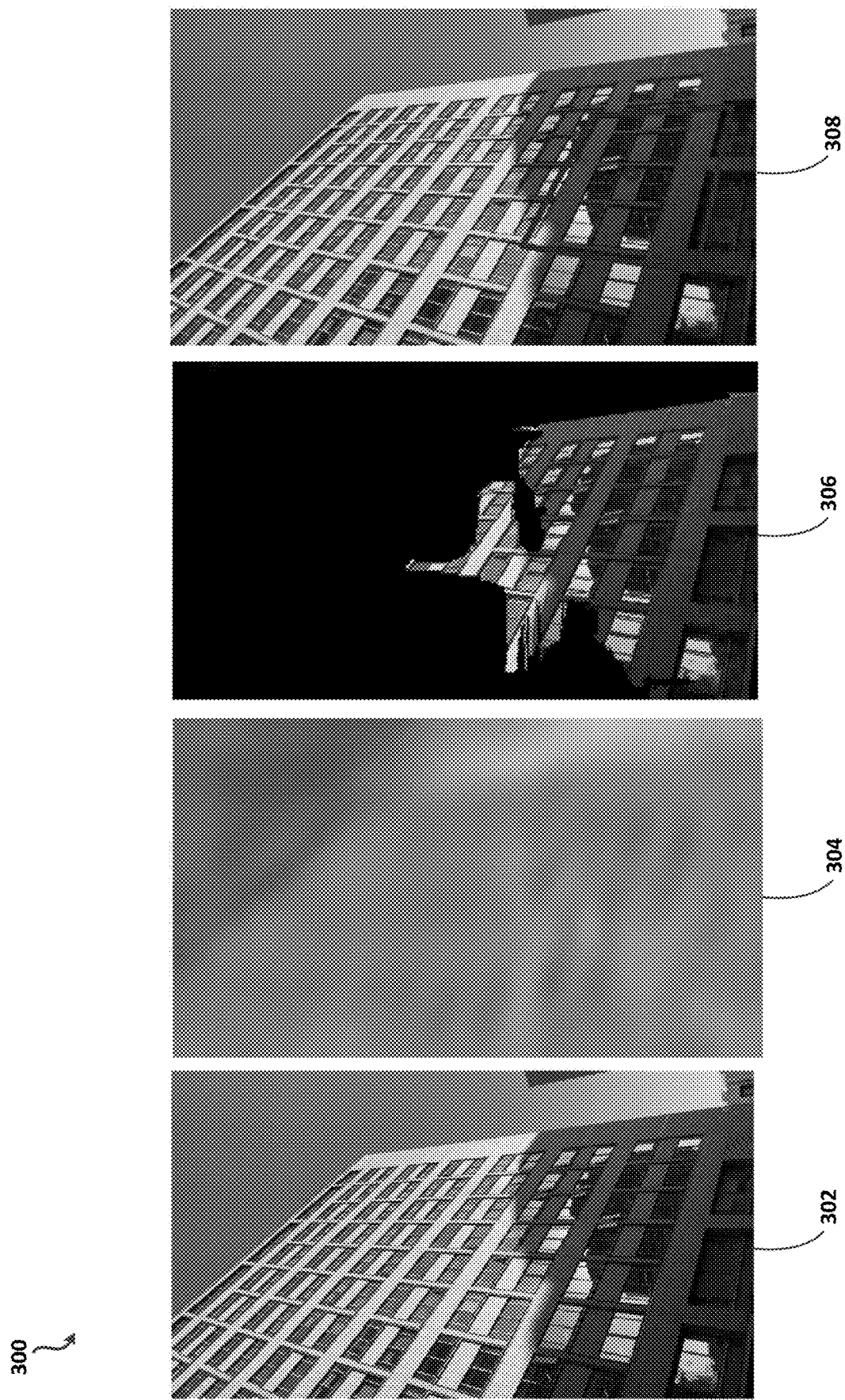
FIG. 3 shows an example set of images corresponding to various stages of a box detection process in accordance with the present disclosure.

FIG. 3 illustrates example set of images 300 corresponding to various stages of a box detection process performed by a box detection model having the architecture 200 described above. The box detection model receives, as input, a single image 302. As shown in FIG. 3, the single image 302 is an image or video frame that depicts the side of a building. The single image 302 may be an image that a user wants to attach an object (i.e., decal) to. For example, the user may want to attach an object, such as a decal that resembles a poster or a painting, to the side of the building.

The single image 302 may be fed into a first neural network (e.g., first neural network 204). The first neural network may receive the single image 302. The first neural network may receive the image 302 and predict canonical 3D coordinate frames from the image 302. Each pixel in the image 302 corresponds to a surface in the underlying 3D geometry of the scene (i.e., the building and sky) depicted by the image 302. A canonical frame can be identified as represented by three orthogonal axes: one along its normal direction and two in its tangent plane (i.e., X-axis and Y-axis). The first neural network may output the predicted canonical 3D coordinate frames 304 associated with the image 302. In an embodiment, the output 304 includes a X-frame with dimensions H×W×3, where each pixel contains the 3D orientation of the X-axis, a Y-frame with dimensions H×W×3, where each pixel contains the 3D orientation of the Y-axis, and a normal-frame with dimensions H×W×3, where each pixel contains the 3D orientation of the normal plane.

The single image 302 may additionally be fed into a second neural network (e.g., second neural network 206). The second neural network may receive the single image 302. The second neural network may detect planes within the image 302 with their plane parameters and segmentation masks. The second neural network may be configured to output the segmentation masks. In an embodiment, the second neural network outputs N segmentation masks, where the foreground region of each segmentation mask denotes a plane detected within the image 302.

In an embodiment, a vanishing point detection model (e.g., vanishing point detection model 208) calculates, for each plane detected within the image 302 by the second neural network, orthogonal vanishing points. As discussed above, the orthogonal vanishing points provide information related to the orientation of the camera that took the image 302, the world structure depicted by the image 302, and the internal parameters of the image 302. The output 306 depicts a segmentation mask with orthogonal vanishing points corresponding to the image 302.

A fusion model (e.g., fusion model 210) may receive the output 304 and the output 306. The output 306 may be used to refine the output 304. To refine the output 306 from the output 304, a confidence of the orthogonal vanishing points may be determined based on the quantity of detected lines associated with the orthogonal vanishing points. For example, if the difference between the predicted normal associated with the output 304 and the normal computed from the orthogonal vanishing points is smaller than a predetermined threshold, this may indicate that the orthogonal vanishing points are confident. If the orthogonal vanishing points are confident, then the orthogonal vanishing points may be utilized to find the main 3D axis. Conversely, if the difference between the predicted normal associated with the output 304 and the normal computed from the orthogonal vanishing points is greater than or equal to the predetermined threshold, this may indicate that the orthogonal vanishing points are not confident. If the orthogonal vanishing points are not confident, then the output 304 may be utilized as the main 3D axis.

In embodiments, a depth model (e.g., depth model 212) receives the fusion results from the fusion model. For example, the depth model may utilize the average normal of the plane computed by the fusion model to calculate a pseudo depth of each pixel inside the plane. The depth model may obtain the depth values of each pixel within the plane, and thus calculate their 3D coordinates. The depth model may determine the four corners of a bounding box. To determine the four corners of the bounding box, the depth model 212 may project each 3D point to the X-axis and Y-axis and may calculate the four corners p1, p2, p3, and p4 of the bounding box.

Figure 4:
FIG. 4 shows an example image including an attached object in accordance with the present disclosure.

A projection model (e.g., projection model 214) may receive these four corners from the depth model and may project these four corners to image space as shown in image 308. An object, such as a decal, may be attached to the bounding box shown in image 308. For example, as shown in FIG. 4, objects 402a-b may be attached to the image 400 so that it appears like objects 402a-b are stuck to or attached to the side of the building depicted in the image. The objects attached to the image may be two-dimensional or three-dimensional graphics.

Figure 5:
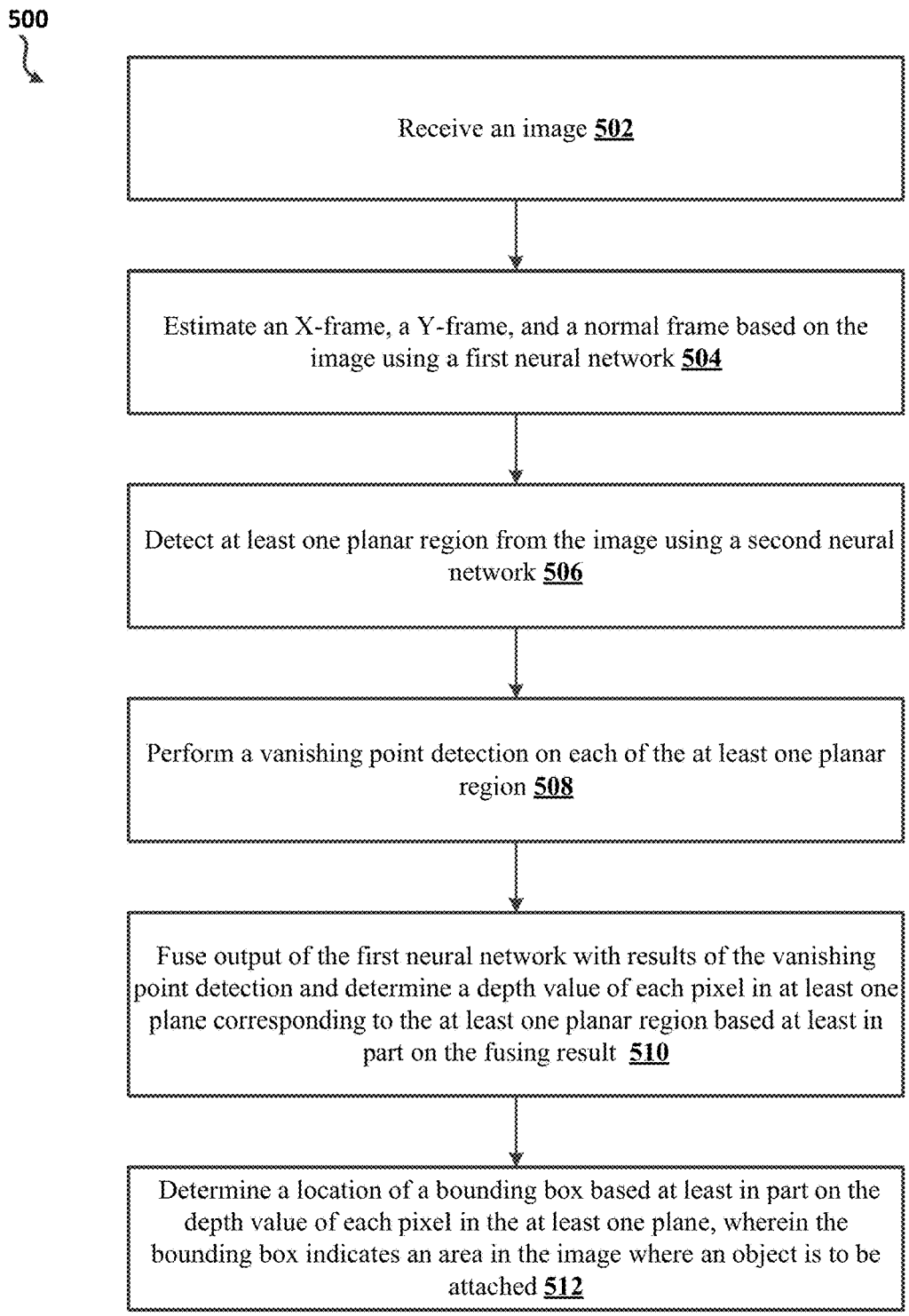
FIG. 5 shows an example process for box detection in accordance with the present disclosure.

FIG. 5 illustrates an example process 500. The box detection model 115 (client-side and/or server-side) may perform the process 500 to detect a 3D box for object attachment. Although depicted as a sequence of operations in FIG. 5, those of ordinary skill in the art will appreciate that various embodiments may add, remove, reorder, or modify the depicted operations.

As discussed above, a box detection model may receive, as input, a single image. At 502, an image may be received. The image may, for example, depict a 3D environment or scene that a user wants to attach an object (i.e., decal) to. For example, the user may want to attach an object, such as a decal that resembles a poster or a painting, to the side of a building that is depicted in the image.

The image may be fed into a first neural network (e.g., first neural network 204). The first neural network may receive and predict canonical 3D coordinate frames from the image. The first neural network may output the predicted canonical 3D coordinate frames associated with the image. At 504, an X-frame, a Y-frame, and a normal frame may be estimated based on the image using the first neural network. In an embodiment, the output of the first neural network includes an X-frame with dimensions H×W×3, where each pixel contains the 3D orientation of the X-axis, a Y-frame with dimensions H×W×3, where each pixel contains the 3D orientation of the Y-axis, and a normal-frame with dimensions H×W×3, where each pixel contains the 3D orientation of the normal plane.

The image may additionally be fed into a second neural network (e.g., second neural network 206). The second neural network may receive the image and detect planes within the image with their plane parameters and segmentation masks. At 506, at least one planar region from the image may be detected using the second neural network. The second neural network may be configured to output the segmentation masks. In an embodiment, the second neural network outputs N segmentation masks, where the foreground region of each segmentation mask denotes a plane detected within the image.

In an embodiment, a vanishing point detection model (e.g., vanishing point detection model 208) calculates, for each plane detected within the image by the second neural network, orthogonal vanishing points. At 508, a vanishing point detection may be performed on each of the at least one planar region. As discussed above, the orthogonal vanishing points provide information related to the orientation of the camera that took the image, the world structure depicted by the image, and the internal parameters of the image.

A fusion model (e.g., fusion model 210) may receive the output 304 and the output 306. The output 306 may be used to refine the output 304. At 510, output of the first neural network may be fused with results of the vanishing point detection. To perform the fusion, a confidence of the orthogonal vanishing points may be determined based on the quantity of detected lines associated with the orthogonal vanishing points. A depth value of each pixel in at least one plane corresponding to the at least one planar region may be determined based at least in part on a result of the fusing.

In embodiments, a depth model (e.g., depth model 212) receives the fusion results from the fusion model. For example, the depth model may utilize the average normal of the plane computed by the fusion model to calculate a pseudo depth of each pixel inside the plane. The depth model may obtain the depth values of each pixel within the plane, and thus calculate their 3D coordinates. At 512, a location of a bounding box may be determined based at least in part on the depth value of each pixel in the at least one plane. The bounding box indicates an area in the image where an object is to be attached.

Figure 6:
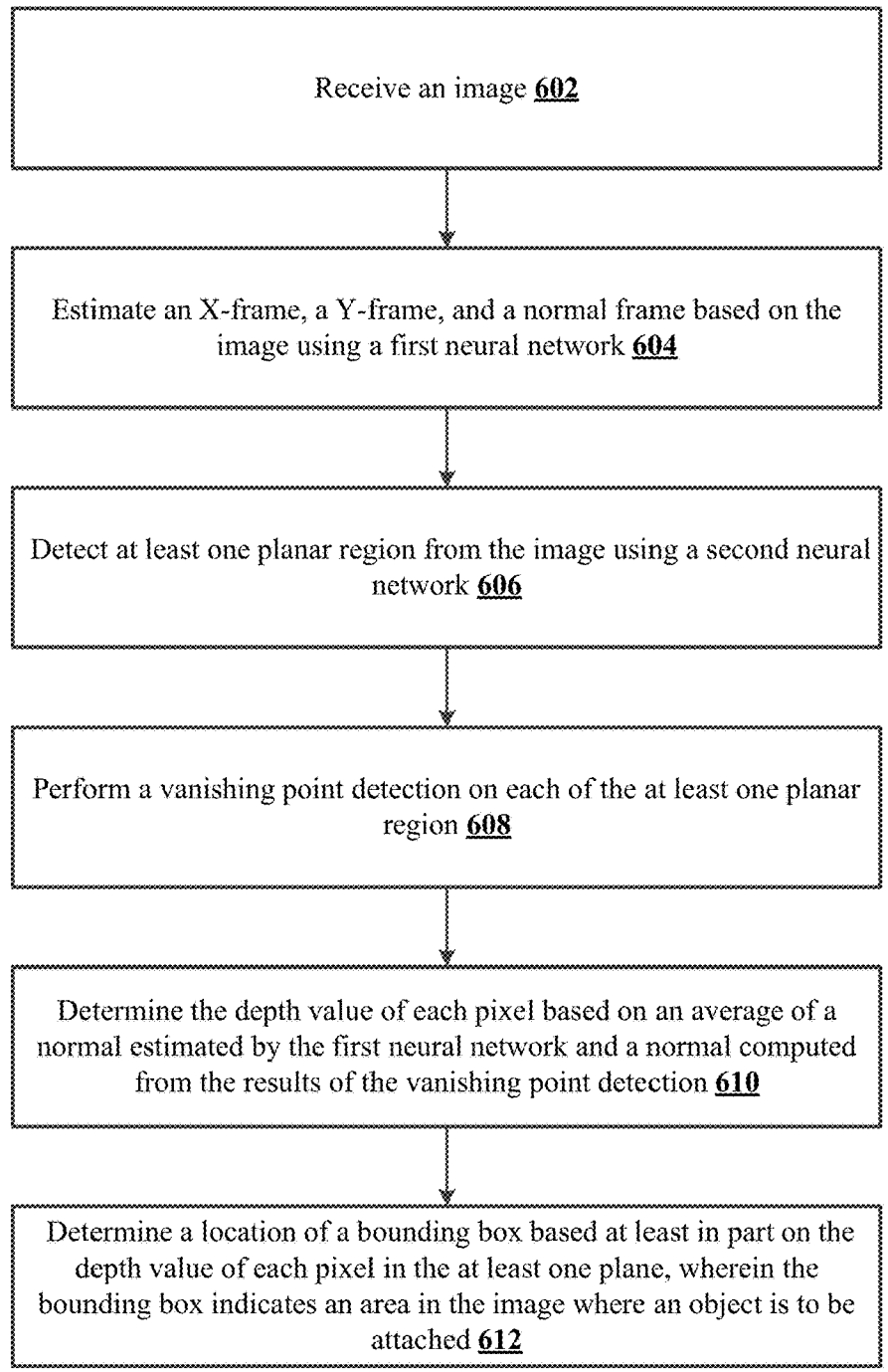
FIG. 6 shows an example process for box detection in accordance with the present disclosure.

FIG. 6 illustrates an example process 600. The box detection model 115 (client-side or server-side) may perform the process 600 to detect a 3D box for object attachment. Although depicted as a sequence of operations in FIG. 6, those of ordinary skill in the art will appreciate that various embodiments may add, remove, reorder, or modify the depicted operations.

As discussed above, a box detection model may receive, as input, a single image. At 602, an image may be received. The image may, for example, depict a 3D environment or scene that a user wants to attach an object (i.e., decal) to. For example, the user may want to attach an object, such as a decal that resembles a poster or a painting, to the side of a building that is depicted in the image.

The image may be fed into a first neural network (e.g., first neural network 204). The first neural network may receive and predict canonical 3D coordinate frames from the image. The first neural network may output the predicted canonical 3D coordinate frames associated with the image. At 604, an X-frame, a Y-frame, and a normal frame may be estimated based on the image using the first neural network. In an embodiment, the output of the first neural network includes an X-frame with dimensions H×W×3, where each pixel contains the 3D orientation of the X-axis, a Y-frame with dimensions H×W×3, where each pixel contains the 3D orientation of the Y-axis, and a normal-frame with dimensions H×W×3, where each pixel contains the 3D orientation of the normal plane.

The image may additionally be fed into a second neural network (e.g., second neural network 206). The second neural network may receive the image and detect planes within the image with their plane parameters and segmentation masks. At 606, at least one planar region from the image may be detected using the second neural network. The second neural network may be configured to output the segmentation masks. In an embodiment, the second neural network outputs N segmentation masks, where the foreground region of each segmentation mask denotes a plane detected within the image.

In an embodiment, a vanishing point detection model (e.g., vanishing point detection model 208) calculates, for each plane detected within the image by the second neural network, orthogonal vanishing points. At 608, a vanishing point detection may be performed on each of the at least one planar region. As discussed above, the orthogonal vanishing points provide information related to the orientation of the camera that took the image, the world structure depicted by the image, and the internal parameters of the image.

A fusion model (e.g., fusion model 210) may receive the output from the first neural network and the results of the vanishing point detection. The results of the vanishing point detection may be used to refine the output from the first neural network. For example, output of the first neural network may be fused with results of the vanishing point detection. To perform the fusion, a confidence of the orthogonal vanishing points may be determined based on the quantity of detected lines associated with the orthogonal vanishing points. A depth value of each pixel in at least one plane corresponding to the at least one planar region may be determined based at least in part on a result of the fusing.

For example, if the difference between the predicted normal associated with the first neural network and the normal computed from the vanishing point detection model is smaller than a predetermined threshold, this may indicate that the results from the vanishing point detection model are confident. If the results from the vanishing point detection model are confident, then the results from the vanishing point detection model may be utilized to find the main 3D axis. Conversely, if the difference between the predicted normal associated with the first neural network and the normal computed from the vanishing point detection model is greater than or equal to the predetermined threshold, this may indicate that the results from the vanishing point detection model are not confident. If the results from the vanishing point detection model are not confident, then the output from the first neural network may be utilized as the main 3D axis.

In some embodiments, an average, such as a weighted average, of the output from the first neural network and the results from the vanishing point detection model may be utilized as the main 3D axis. For example, the results from the vanishing point detection model may be assigned a greater weight if it is determined that the results from the vanishing point detection model are confident. Conversely, the results from the vanishing point detection model may be assigned a lesser weight if it is determined that the results from the vanishing point detection model are not confident.

In embodiments, a depth model (e.g., depth model 212) receives the fusion results from the fusion model. For example, the depth model may utilize the average normal of the plane computed by the fusion model to calculate a pseudo depth of each pixel inside the plane. At 610, the depth value of each pixel may be determined based on an average of a normal estimated by the first neural network and a normal computed from the results of the vanishing point detection. The depth model may obtain the depth values of each pixel within the plane, and thus calculate their 3D coordinates. At 612, a location of a bounding box may be determined based at least in part on the depth value of each pixel in the at least one plane. The bounding box indicates an area in the image where an object is to be attached.

Figure 7:
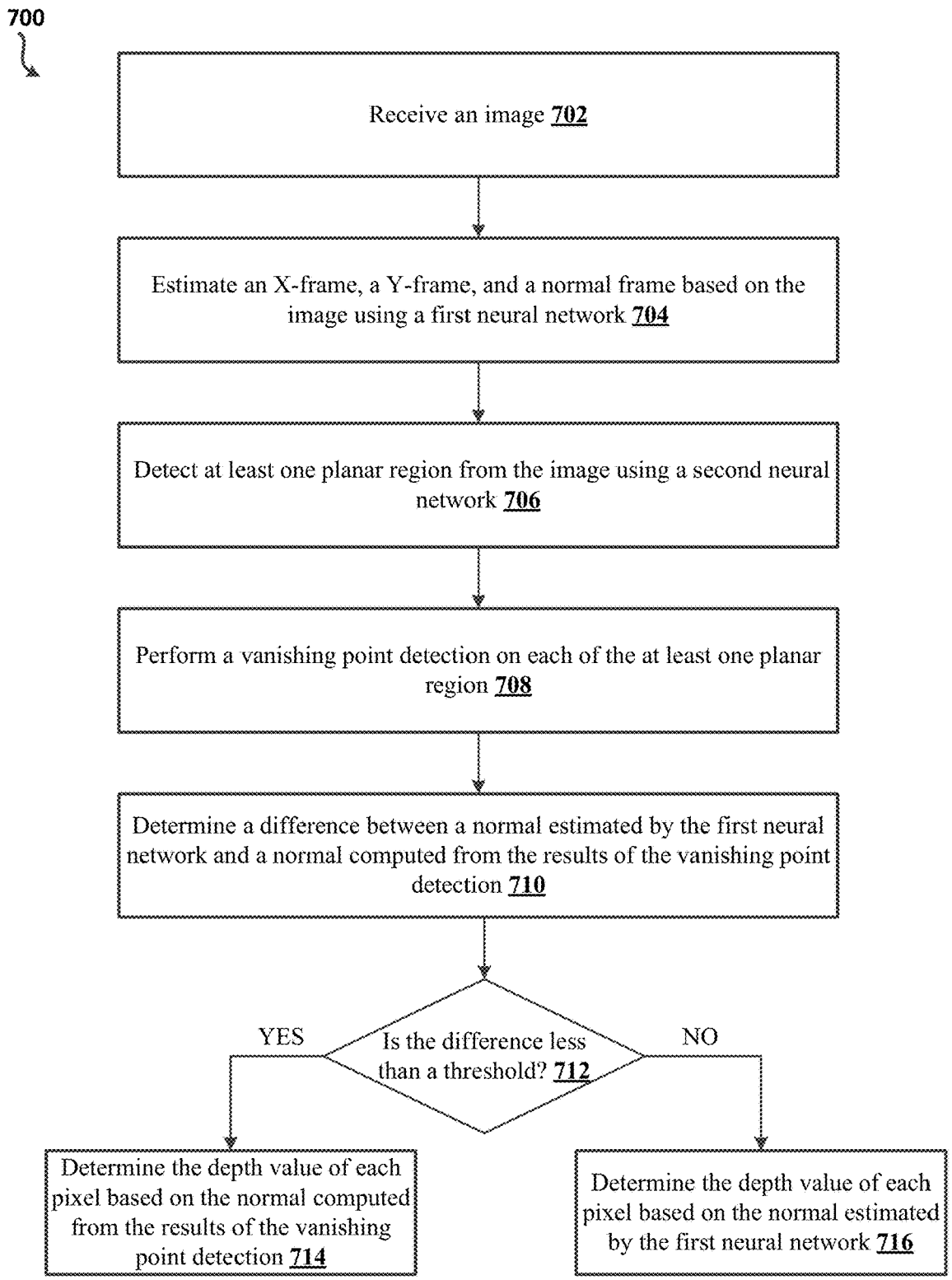
FIG. 7 shows an example process for box detection in accordance with the present disclosure.

FIG. 7 illustrates an example process 700. The box detection model 115 (client-side or server-side) may perform the process 700 to detect a 3D box for object attachment. Although depicted as a sequence of operations in FIG. 7, those of ordinary skill in the art will appreciate that various embodiments may add, remove, reorder, or modify the depicted operations.

As discussed above, a box detection model may receive, as input, a single image. At 702, an image may be received. The image may, for example, depict a 3D environment or scene that a user wants to attach an object (i.e., decal) to. For example, the user may want to attach an object, such as a decal that resembles a poster or a painting, to the side of a building that is depicted in the image.

The image may be fed into a first neural network (e.g., first neural network 204). The first neural network may receive and predict canonical 3D coordinate frames from the image. The first neural network may output the predicted canonical 3D coordinate frames associated with the image. At 704, an X-frame, a Y-frame, and a normal frame may be estimated based on the image using the first neural network. In an embodiment, the output of the first neural network includes an X-frame with dimensions H×W×3, where each pixel contains the 3D orientation of the X-axis, a Y-frame with dimensions H×W×3, where each pixel contains the 3D orientation of the Y-axis, and a normal-frame with dimensions H×W×3, where each pixel contains the 3D orientation of the normal plane.

The image may additionally be fed into a second neural network (e.g., second neural network 206). The second neural network may receive the image and detect planes within the image with their plane parameters and segmentation masks. At 706, at least one planar region from the image may be detected using the second neural network. The second neural network may be configured to output the segmentation masks. In an embodiment, the second neural network outputs N segmentation masks, where the foreground region of each segmentation mask denotes a plane detected within the image.

In an embodiment, a vanishing point detection model (e.g., vanishing point detection model 208) calculates, for each plane detected within the image by the second neural network, orthogonal vanishing points. At 708, a vanishing point detection may be performed on each of the at least one planar region. As discussed above, the orthogonal vanishing points provide information related to the orientation of the camera that took the image, the world structure depicted by the image, and the internal parameters of the image.

A fusion model (e.g., fusion model 210) may receive the output from the first neural network and the results of the vanishing point detection. The results of the vanishing point detection may be used to refine the output from the first neural network. For example, output of the first neural network may be fused with results of the vanishing point detection. To perform the fusion, a confidence of the orthogonal vanishing points may be determined based on the quantity of detected lines associated with the orthogonal vanishing points. A depth value of each pixel in at least one plane corresponding to the at least one planar region may be determined based at least in part on a result of the fusing.

At 710, a difference between a normal estimated by the first neural network and a normal computed from the results of the vanishing point detection may be determined. At 712, it may be determined if the difference less than a predetermined threshold. If it is determined that the difference is less than a predetermined threshold, this may indicate that the results from the vanishing point detection model are confident and the method 700 can proceed to step 714. At 714, the results from the vanishing point detection model may be utilized to find the main 3D axis. The depth value of each pixel may be determined based on the normal computed from the results of the vanishing point detection. Conversely, if it is determined that the difference is greater than or equal to the predetermined threshold, this may indicate that the results from the vanishing point detection model are not confident and the method 700 can proceed to step 716. If the results from the vanishing point detection model are not confident, then the output from the first neural network may be utilized as the main 3D axis. At 716, the depth value of each pixel may be determined based on the normal estimated by the first neural network.

Figure 8:
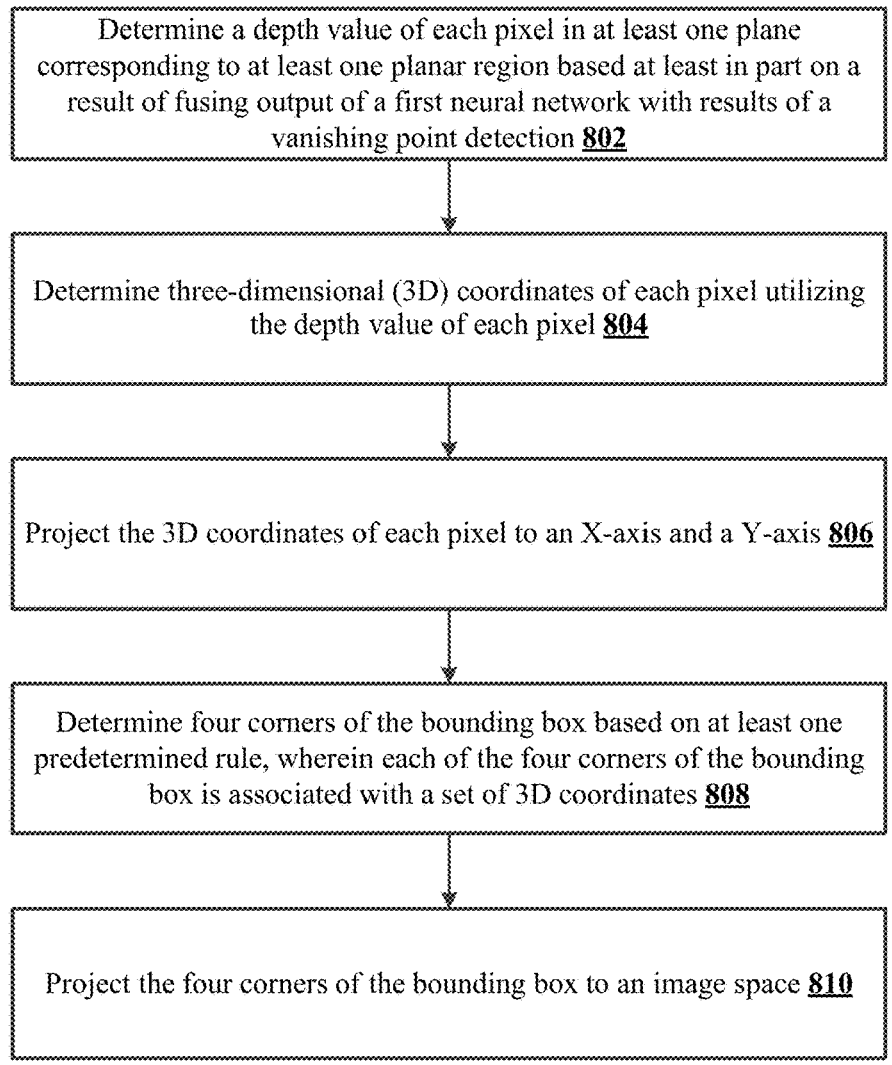
FIG. 8 shows an example process for box detection in accordance with the present disclosure.

FIG. 8 illustrates an example process 800. The box detection model 115 (client-side or server-side) may perform the process 800 to detect a 3D box for object attachment. Although depicted as a sequence of operations in FIG. 8, those of ordinary skill in the art will appreciate that various embodiments may add, remove, reorder, or modify the depicted operations.

A depth model (e.g., depth model 212) may receive fusion results from a fusion model (e.g., fusion model 210). For example, the depth model may utilize the average normal of at least one plane computed by the fusion model to calculate a pseudo depth of each pixel inside the at least one plane. At 802, a depth value of each pixel in at least one plane corresponding to at least one planar region may be determined based at least in part on a result of fusing output of a first neural network with results of a vanishing point detection. The central pixel may be set with a depth of 1.0, and the depth value of other pixels inside the plane may be determined with default camera intrinsics. For example, the depth model may solve:

$$\begin{bmatrix} u_i \\ v_i \\ 1 \end{bmatrix} \cdot d_i = \begin{bmatrix} f_x & 0 & c_x \\ 0 & f_y & c_y \\ 0 & 0 & 1 \end{bmatrix} \begin{bmatrix} x_i \\ y_i \\ z_i \end{bmatrix}$$

-continued $$([x_i, y_i, z_i] - [x_0, y_0, z_0]) \cdot \begin{bmatrix} n_x \\ n_y \\ n_z \end{bmatrix} = 0,$$

where $(u_i, v_i)$ denotes the i-th pixel coordinate, $d_i$ denotes the i-th pixel depth value, $\{f_x, f_y, c_x, c_y\}$ denotes camera intrinsics, $(x_i, y_i, z_i)$ denotes the 3D coordinate in camera frame, $(n_x, n_y, n_z)$ represents the normal of the plane, and the central pixel is set with depth 1.0 (i.e., $x_0=0$, $y_0=0$, $z_0=1$). The depth model may solve the above equation to obtain the depth values of each pixel within the plane, and thus to calculate their 3D coordinates $(x_i, y_i, z_i)$. At 804, three-dimensional (3D) coordinates of each pixel may be determined utilizing the depth value of each pixel.

The depth model may determine the four corners of a bounding box. To determine the four corners of the bounding box, the depth model may project each 3D point to the X-axis and Y-axis at 806. The depth model may project each 3D point to the X-axis and Y-axis as follows:

$$\hat{u}_i = ([x_i, y_i, z_i] - [x_0, y_0, z_0]) \cdot \begin{bmatrix} \overline{u}_x \\ \overline{u}_y \\ \overline{u}_z \end{bmatrix}, \text{ and}$$

$$\hat{v}_i = ([x_i, y_i, z_i] - [x_0, y_0, z_0]) \cdot \begin{bmatrix} \overline{v}_x \\ \overline{v}_y \\ \overline{v}_z \end{bmatrix}$$

where $(\overline{u}_x, \overline{u}_y, \overline{u}_z)$ and $(\overline{v}_x, \overline{v}_y, \overline{v}_z)$ are the X-axis and the Y-axis, respectively. At 808, four corners of the bounding box may be determined based on at least one predetermined rule, wherein each of the four corners of the bounding box is associated with a set of 3D coordinates. The predetermined rule may indicate, for example, that $(\hat{u}_{min}, \hat{v}_{min})$ is the 15% quartile of $\{\hat{u}_i\}$ and $\{\hat{v}_i\}$, and $(\hat{u}_{max}, \hat{v}_{max})$ is the 85% quartile of $\{\hat{u}_i\}$ and $\{\hat{v}_i\}$. Then, the depth model calculates the four corners p1, p2, p3, and p4 of the bounding box by:

$$p1 = [x_0, y_0, z_0] + \hat{u}_{min} * [\overline{u}_x, \overline{u}_y, \overline{u}_z] + \hat{v}_{min} * [\overline{v}_x, \overline{v}_y, \overline{v}_z],$$
$$p2 = [x_0, y_0, z_0] + \hat{u}_{min} * [\overline{u}_x, \overline{u}_y, \overline{u}_z] + \hat{v}_{max} * [\overline{v}_x, \overline{v}_y, \overline{v}_z],$$
$$p3 = [x_0, y_0, z_0] + \hat{u}_{max} * [\overline{u}_x, \overline{u}_y, \overline{u}_z] + \hat{v}_{min} * [\overline{v}_x, \overline{v}_y, \overline{v}_z],$$
$$p4 = [x_0, y_0, z_0] + \hat{u}_{max} * [\overline{u}_x, \overline{u}_y, \overline{u}_z] + \hat{v}_{max} * [\overline{v}_x, \overline{v}_y, \overline{v}_z].$$

A projection model (e.g., projection model 214) may receive these four corners from the depth model. The projection model may project these four corners to image space. At 810, the four corners of the bounding box may be projected to an image space. For example, the projection model may, with the camera intrinsics, project these four corners to image space.

Figure 9:
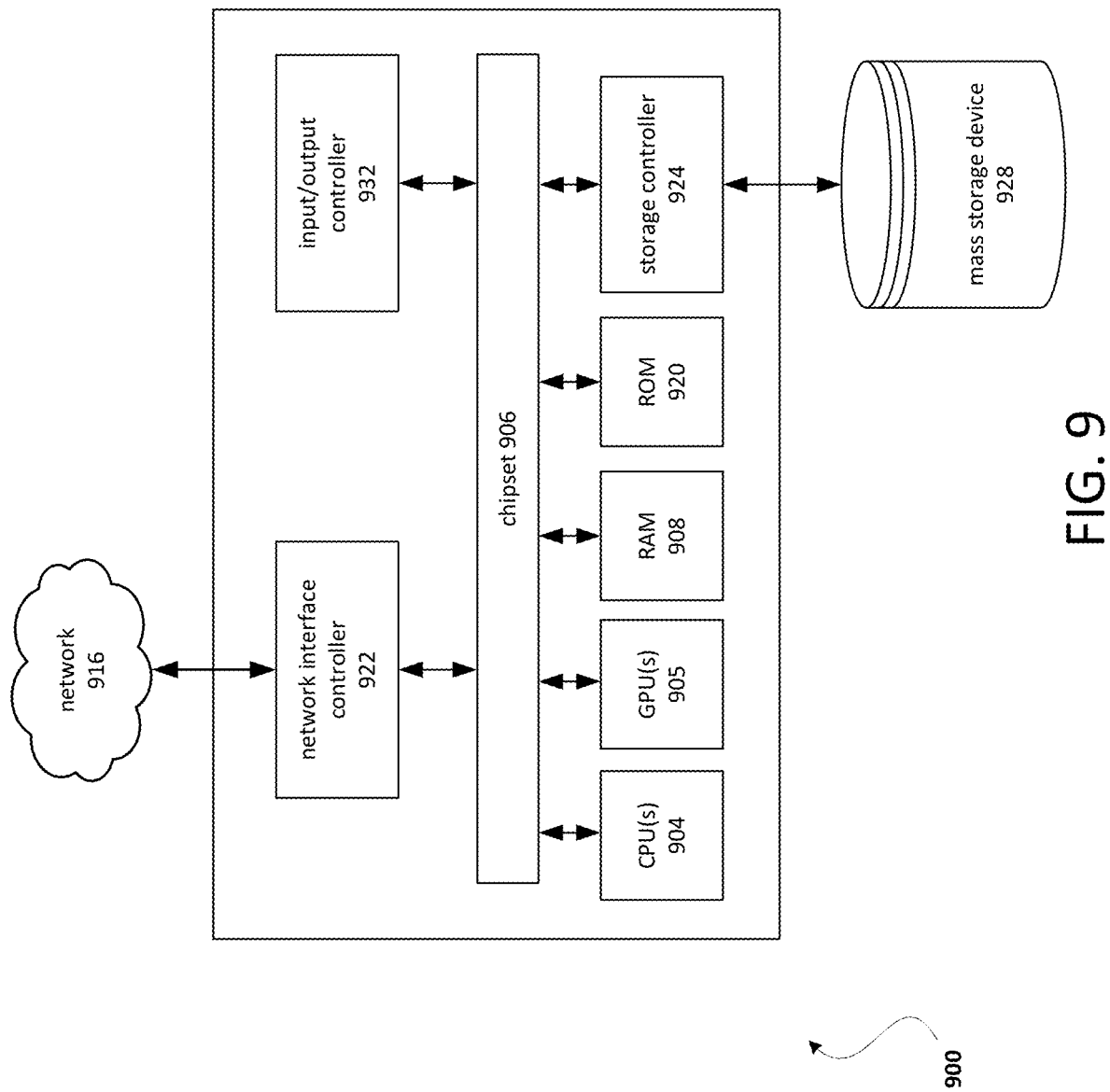
FIG. 9 shows an example computing device which may be used to perform any of the techniques disclosed herein.

FIG. 9 illustrates a computing device that may be used in various aspects, such as the services, networks, modules, and/or devices depicted in FIG. 1. With regard to the example architecture of FIG. 1, the cloud network (and any of its components), the client devices, and/or the network may each be implemented by one or more instance of a computing device 900 of FIG. 9. The computer architecture shown in FIG. 9 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 900 may include a baseboard, or "motherboard," which is a printed circuit board to which a multitude of components or devices may be connected by way of a system bus or other electrical communication paths. One or more central processing units (CPUs) 904 may operate in conjunction with a chipset 906. The CPU(s) 904 may be standard programmable processors that perform arithmetic and logical operations necessary for the operation of the computing device 900.

The CPU(s) 904 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 904 may be augmented with or replaced by other processing units, such as GPU(s) 905. The GPU(s) 905 may comprise processing units specialized for but not necessarily limited to highly parallel computations, such as graphics and other visualization-related processing.

A chipset 906 may provide an interface between the CPU(s) 904 and the remainder of the components and devices on the baseboard. The chipset 906 may provide an interface to a random-access memory (RAM) 908 used as the main memory in the computing device 900. The chipset 906 may further provide an interface to a computer-readable storage medium, such as a read-only memory (ROM) 820 or non-volatile RAM (NVRAM) (not shown), for storing basic routines that may help to start up the computing device 900 and to transfer information between the various components and devices. ROM 820 or NVRAM may also store other software components necessary for the operation of the computing device 900 in accordance with the aspects described herein.

The computing device 900 may operate in a networked environment using logical connections to remote computing nodes and computer systems through local area network (LAN). The chipset 906 may include functionality for providing network connectivity through a network interface controller (NIC) 922, such as a gigabit Ethernet adapter. A NIC 822 may be capable of connecting the computing device 900 to other computing nodes over a network 916. It should be appreciated that multiple NICs 822 may be present in the computing device 900, connecting the computing device to other types of networks and remote computer systems.

The computing device 900 may be connected to a mass storage device 928 that provides non-volatile storage for the computer. The mass storage device 928 may store system programs, application programs, other program modules, and data, which have been described in greater detail herein. The mass storage device 928 may be connected to the computing device 900 through a storage controller 924 connected to the chipset 906. The mass storage device 928 may consist of one or more physical storage units. The mass storage device 928 may comprise a management component. A storage controller 924 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 900 may store data on the mass storage device 928 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 928 is characterized as primary or secondary storage and the like.

For example, the computing device 900 may store information to the mass storage device 928 by issuing instructions through a storage controller 924 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 900 may further read information from the mass storage device 928 by detecting the physical states or characteristics of one or more particular locations within the physical storage units.

In addition to the mass storage device 928 described above, the computing device 900 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 900.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 928 depicted in FIG. 9, may store an operating system utilized to control the operation of the computing device 900. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 928 may store other system or application programs and data utilized by the computing device 900.

The mass storage device 928 or other computer-readable storage media may also be encoded with computer-executable instructions, which, when loaded into the computing device 900, transforms the computing device from a general-purpose computing system into a special-purpose computer capable of implementing the aspects described herein. These computer-executable instructions transform the computing device 900 by specifying how the CPU(s) 904 transition between states, as described above. The computing device 900 may have access to computer-readable storage media storing computer-executable instructions, which, when executed by the computing device 900, may perform the methods described herein.

A computing device, such as the computing device 900 depicted in FIG. 9, may also include an input/output controller 932 for receiving and processing input from a number of input devices, such as a keyboard, a mouse, a touchpad, a touch screen, an electronic stylus, or other type of input device. Similarly, an input/output controller 932 may provide output to a display, such as a computer monitor, a flat-panel display, a digital projector, a printer, a plotter, or other type of output device. It will be appreciated that the computing device 900 may not include all of the components shown in FIG. 9, may include other components that are not explicitly shown in FIG. 9, or may utilize an architecture completely different than that shown in FIG. 9.

As described herein, a computing device may be a physical computing device, such as the computing device 900 of FIG. 9. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks. CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow: plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method, comprising:
receiving an image;
estimating an X-frame, a Y-frame, and a normal frame based on the image using a first neural network;
detecting at least one planar region from the image using a second neural network;
performing a vanishing point detection on each of the at least one planar region;
fusing output of the first neural network with results of the vanishing point detection and determining a depth value of each pixel in at least one plane corresponding to the at least one planar region based at least in part on a result of the fusing;
determining a location of a bounding box based at least in part on the depth value of each pixel in the at least one plane, wherein the bounding box indicates an area in the image where an object is to be attached;
wherein the method further comprises:
determining a difference between a normal estimated by the first neural network and a normal computed from the results of the vanishing point detection; and
in response to determining that the difference is less than a threshold, determining the depth value of each pixel based on the normal computed from the results of the vanishing point detection.

2. The method of claim 1, further comprising:
determining the depth value of each pixel based on an average of a normal estimated by the first neural network and a normal computed from the results of the vanishing point detection.

3. The method of claim 1, further comprising:
determining a difference between a normal estimated by the first neural network and a normal computed from the results of the vanishing point detection; and
in response to determining that the difference is equal to or greater than a threshold, determining the depth value of each pixel based on the normal estimated by the first neural network.

4. The method of claim 1, further comprising:
determining three-dimensional (3D) coordinates of each pixel utilizing the depth value of each pixel.

5. The method of claim 4, further comprising:
projecting the 3D coordinates of each pixel to an X-axis and a Y-axis.

6. The method of claim 1, further comprising:
determining four corners of the bounding box based on at least one predetermined rule, wherein each of the four corners of the bounding box is associated with a set of 3D coordinates.

7. The method of claim 6, further comprising:
projecting the four corners of the bounding box to an image space.

8. The method of claim 1, wherein the object comprises a two-dimensional (2D) graphic or a three-dimensional (3D) graphic.

9. A system, comprising:
at least one processor; and
at least one memory comprising computer-readable instructions that upon execution by the at least one processor cause the computing device to perform operations comprising:
receiving an image;
estimating an X-frame, a Y-frame, and a normal frame based on the image using a first neural network;
detecting at least one planar region from the image using a second neural network;

performing a vanishing point detection on each of the at least one planar region;

fusing output of the first neural network with results of the vanishing point detection and determining a depth value of each pixel in at least one plane corresponding to the at least one planar region based at least in part on a result of the fusing;

determining a location of a bounding box based at least in part on the depth value of each pixel in the at least one plane, wherein the bounding box indicates an area in the image where an object is to be attached;

wherein the operations further comprise:

determining a difference between a normal estimated by the first neural network and a normal computed from the results of the vanishing point detection; and in response to determining that the difference is less than a threshold, determining the depth value of each pixel based on the normal computed from the results of the vanishing point detection.

10. The system of claim 9, the operations further comprising:

determining the depth value of each pixel based on an average of a normal estimated by the first neural network and a normal computed from the results of the vanishing point detection.

11. The system of claim 9, the operations further comprising:

determining a difference between a normal estimated by the first neural network and a normal computed from the results of the vanishing point detection; and in response to determining that the difference is equal to or greater than a threshold, determining the depth value of each pixel based on the normal estimated by the first neural network.

12. The system of claim 9, the operations further comprising:

determining three-dimensional (3D) coordinates of each pixel utilizing the depth value of each pixel; and projecting the 3D coordinates of each pixel to an X-axis and a Y-axis.

13. The system of claim 9, the operations further comprising:

determining four corners of the bounding box based on at least one predetermined rule, wherein each of the four corners of the bounding box is associated with a set of 3D coordinates; and projecting the four corners of the bounding box to an image space.

14. A non-transitory computer-readable storage medium, storing computer-readable instructions that upon execution by a processor cause the processor to implement operations, the operation comprising:

receiving an image;

estimating an X-frame, a Y-frame, and a normal frame based on the image using a first neural network;

detecting at least one planar region from the image using a second neural network;

performing a vanishing point detection on each of the at least one planar region;

fusing output of the first neural network with results of the vanishing point detection and determining a depth value of each pixel in at least one plane corresponding to the at least one planar region based at least in part on a result of the fusing;

determining a location of a bounding box based at least in part on the depth value of each pixel in the at least one plane, wherein the bounding box indicates an area in the image where an object is to be attached;

wherein the operations further comprise:

determining a difference between a normal estimated by the first neural network and a normal computed from the results of the vanishing point detection; and in response to determining that the difference is less than a threshold, determining the depth value of each pixel based on the normal computed from the results of the vanishing point detection.

15. The non-transitory computer-readable storage medium of claim 14, the operations further comprising:

determining the depth value of each pixel based on an average of a normal estimated by the first neural network and a normal computed from the results of the vanishing point detection.

16. The non-transitory computer-readable storage medium of claim 14, the operations further comprising:

determining a difference between a normal estimated by the first neural network and a normal computed from the results of the vanishing point detection; and in response to determining that the difference is equal to or greater than a threshold, determining the depth value of each pixel based on the normal estimated by the first neural network.

17. The non-transitory computer-readable storage medium of claim 14, the operations further comprising:

determining three-dimensional (3D) coordinates of each pixel utilizing the depth value of each pixel;

determining four corners of the bounding box based on at least one predetermined rule, each of the four corners of the bounding box associated with a set of 3D coordinates; and projecting the four corners of the bounding box to an image space.

* * * * *